(12) United States Patent
Wigley et al.

(10) Patent No.: US 12,711,976 B2
(45) Date of Patent: Aug. 18, 2026

(54) LATENCY HANDLING FOR POINT-TO-POINT COMMUNICATIONS

(71) Applicant: Apple Inc., Cupertino, CA (US)

(72) Inventors: Emily A. Wigley, San Francisco, CA (US); Shai Messingher Lang, Santa Clara, CA (US); Hui-Jung Kuo, Carlsbad, CA (US); Ronald J. Guglielmone, Jr., Redwood City, CA (US)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 18/244,883

(22) Filed: Sep. 11, 2023

(65) Prior Publication Data

US 2024/0135947 A1 Apr. 25, 2024
US 2024/0233742 A9 Jul. 11, 2024

Related U.S. Application Data

(60) Provisional application No. 63/417,668, filed on Oct. 19, 2022.

(51) Int. Cl.

| | |
|---|---|
| ***G10L 21/0208*** | (2013.01) |
| ***G10L 13/02*** | (2013.01) |
| ***G10L 15/00*** | (2013.01) |
| ***H04B 1/10*** | (2006.01) |
| ***H04R 1/10*** | (2026.01) |

(52) U.S. Cl.
CPC .......... *G10L 21/0208* (2013.01); *G10L 13/02* (2013.01); *G10L 15/005* (2013.01); *H04B 1/1027* (2013.01); *H04R 1/1083* (2013.01)

(58) Field of Classification Search
CPC ... G10L 21/0202; G10L 13/02; G10L 15/005; G10L 15/22; G10L 2015/227; H04B 1/1027; H04R 1/1083; H04R 1/406; G06F 3/167; G06F 3/011; G06F 3/165
See application file for complete search history.

(56) References Cited

U.S. PATENT DOCUMENTS 9,877,100 B1 * 1/2018 Tyagi ...................... G10L 15/22
10,325,613 B1 * 6/2019 Lionais ............... G10L 21/0208
11,343,607 B2 * 5/2022 Meiyappan ............. G06F 3/167
2012/0310391 A1 * 12/2012 Sanders ................. G11B 19/08 700/94
2014/0270200 A1 * 9/2014 Usher ..................... G10L 25/78 381/74
2015/0280670 A1 * 10/2015 Kauffmann ......... G10L 21/0316 381/107

(Continued)

FOREIGN PATENT DOCUMENTS

CN 111684820 A * 9/2020 ....... G10K 11/17885
EP 2760015 A1 * 7/2014 ............ G10L 15/22

(Continued)

*Primary Examiner* — Mohammad K Islam
(74) *Attorney, Agent, or Firm* — BAKERHOSTETLER

(57) ABSTRACT

Aspects of the subject technology provide improved point-to-point audio communications based on human variable sensitivity to latency differences in multipath communications. In aspects, improved techniques may include measuring a level of ambient noise, and then selecting processing for a received electronic audio based on the measured level of ambient noise before emitting the processed audio signal at a loudspeaker worn by a listener.

20 Claims, 3 Drawing Sheets

(56) References Cited

U.S. PATENT DOCUMENTS

| | | | | |
|---|---|---|---|---|
| 2016/0104501 | A1* | 4/2016 | Weingold | G10L 21/0208 381/71.1 |
| 2017/0295604 | A1* | 10/2017 | Andersen | G06F 3/04842 |
| 2017/0318374 | A1* | 11/2017 | Dolenc | H04R 29/004 |
| 2017/0345429 | A1* | 11/2017 | Hardee | G10L 25/93 |
| 2017/0347180 | A1* | 11/2017 | Petrank | G06F 3/165 |
| 2019/0130929 | A1* | 5/2019 | Raghunandan | H04R 29/001 |
| 2019/0222919 | A1 | 7/2019 | Cox, Jr. et al. | |
| 2020/0117287 | A1* | 4/2020 | Yaron | G06F 3/167 |
| 2020/0296510 | A1* | 9/2020 | Li | H04R 1/1083 |
| 2020/0348901 | A1* | 11/2020 | An | H04R 1/1041 |
| 2022/0030349 | A1* | 1/2022 | Li | H04R 1/1041 |
| 2023/0223041 | A1* | 7/2023 | Mosayyebpour | G10L 21/0208 704/233 |
| 2023/0223042 | A1* | 7/2023 | Mosayyebpour | G10L 21/0216 704/233 |

FOREIGN PATENT DOCUMENTS

| | | | | |
|---|---|---|---|---|
| EP | 3188495 | A1 * | 7/2017 | H04R 1/1041 |
| EP | 3282678 | A1 * | 2/2018 | H04R 3/04 |
| TW | 1241828 | B * | 10/2005 | G06F 3/011 |
| WO | WO-2020251902 | A1 * | 12/2020 | G10K 11/17873 |
| WO | WO-2026057289 | A1 * | 3/2026 | G10L 19/008 |

* cited by examiner

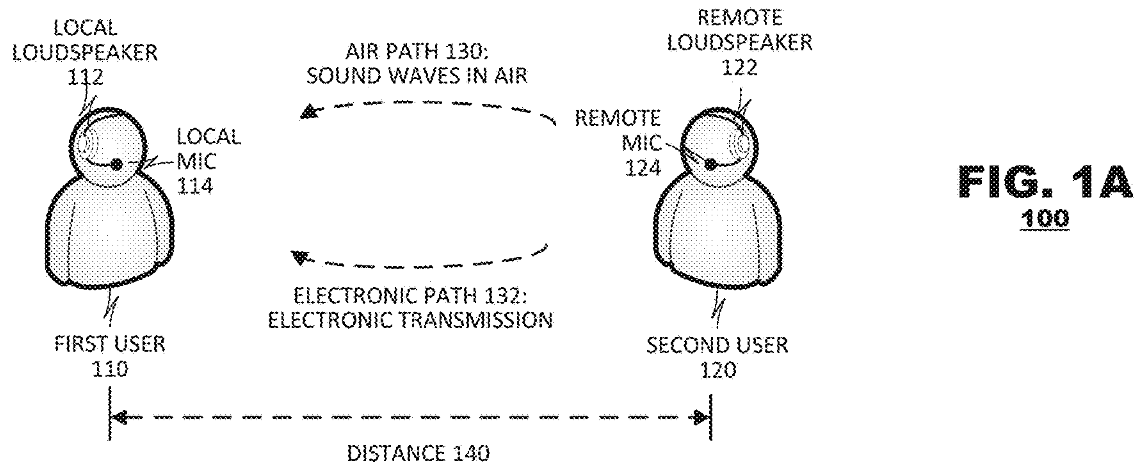
FIG. 1A
100
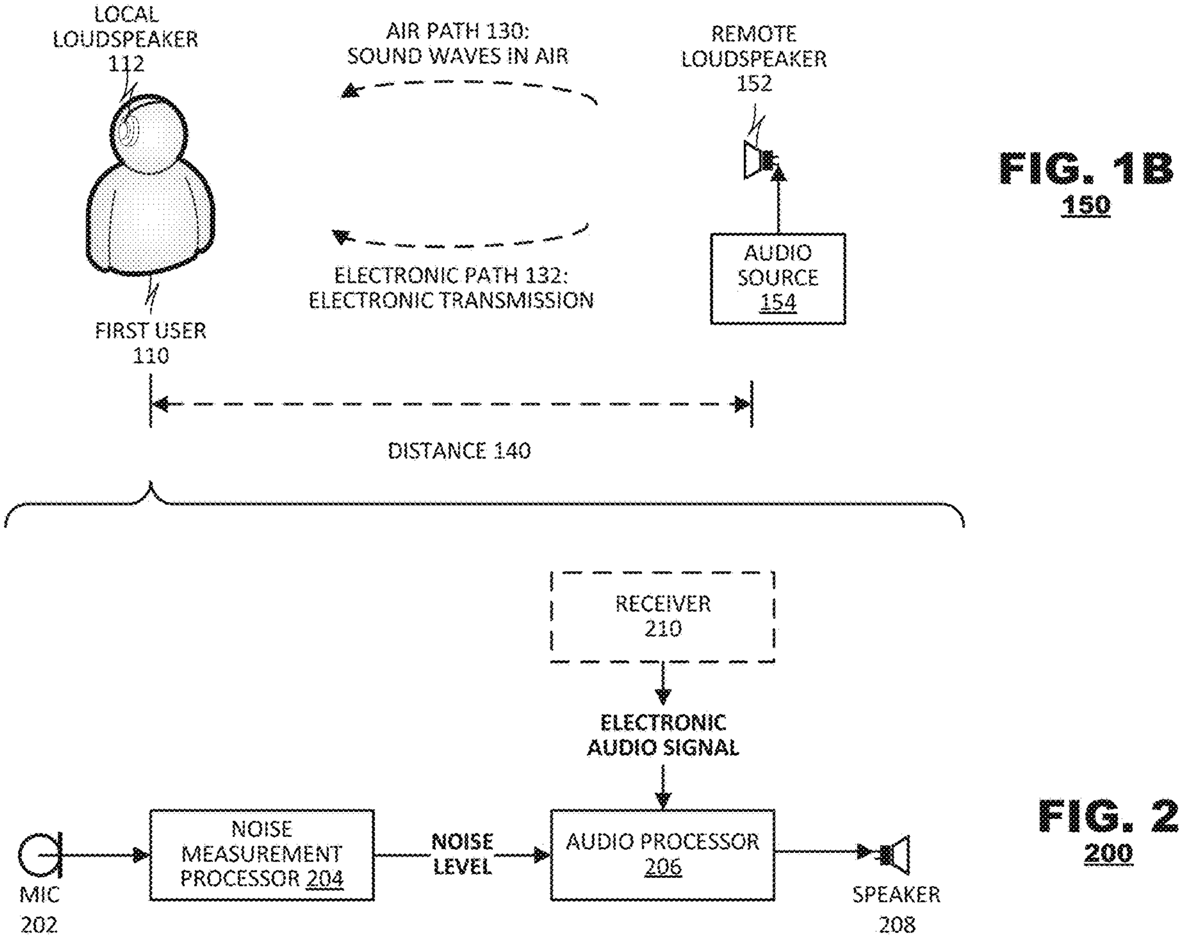
FIG. 1B
150
FIG. 2
200

300

400

LATENCY HANDLING FOR POINT-TO-POINT COMMUNICATIONS

CROSS REFERENCE TO RELATED APPLICATIONS

This application claims the benefit of priority to U.S. Provisional Patent Application No. 63/417,668, entitled "Latency Handling for Point-to-Point Communications", filed on Oct. 19, 2022, the disclosure of which is hereby incorporated herein in its entirety.

TECHNICAL FIELD

The present description relates generally to point-to-point audio communications systems.

BACKGROUND

Point-to-point electronic audio communication systems enable or enhance communications between two points, such as between two humans talking to each other. In one example, an electronic signal source from a microphone near a human speaker may be amplified via a speaker near a human listener. In another example, an electronic audio signal may be processed in order to make the audio signal more intelligible to a human listener.

BRIEF DESCRIPTION OF THE DRAWINGS

Certain features of the subject technology are set forth in the appended claims.

However, for purpose of explanation, several implementations of the subject technology are set forth in the following figures.

FIG. 1A illustrates an example point-to-point audio communication scenario.

FIG. 1B illustrates an example point-to-point audio communication scenario.

FIG. 2 illustrates an example audio processing system according to aspects of the subject technology.

DETAILED DESCRIPTION

Figure 3:
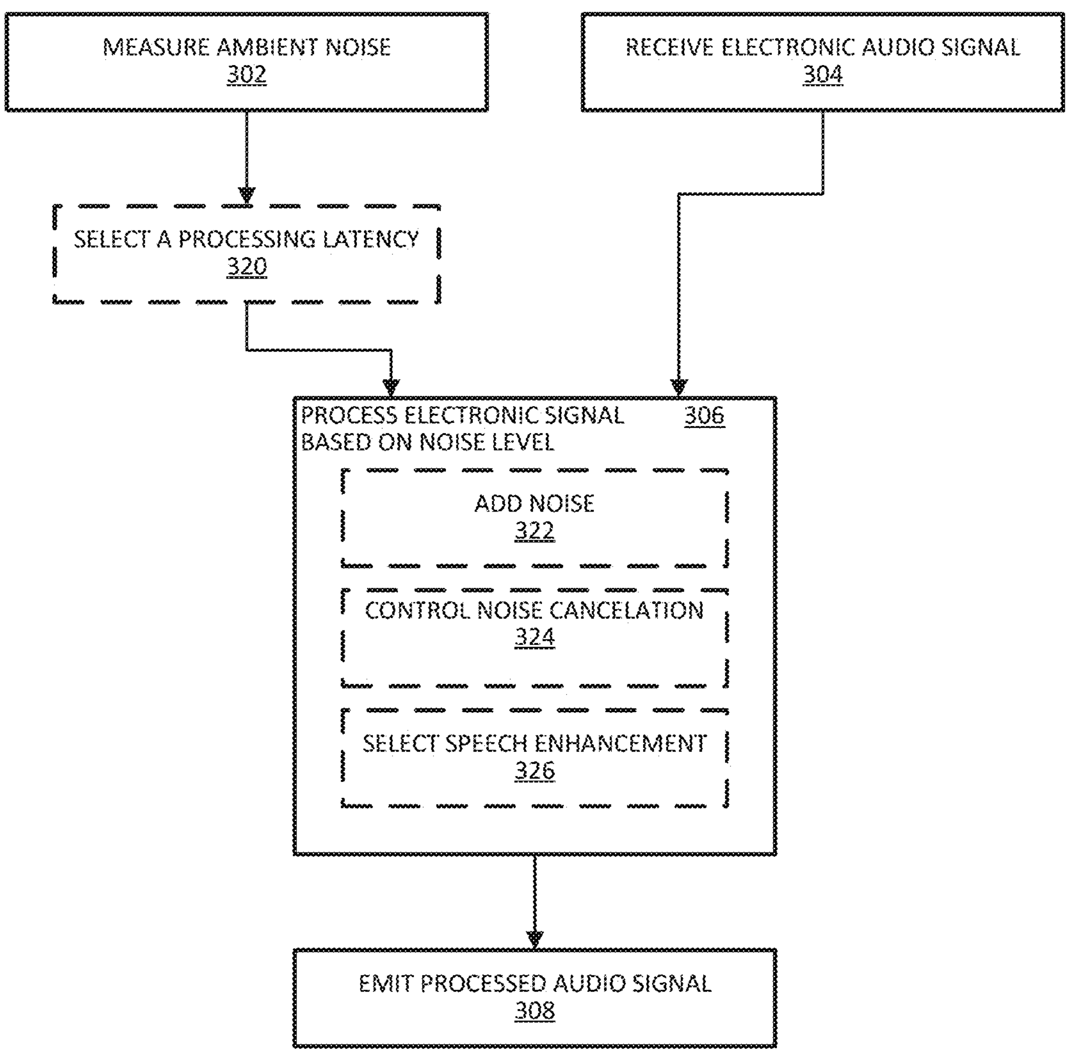
FIG. 3 illustrates an example method for audio processing according to aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Techniques for improved point-to-point communications may include selection of processing for an electronic audio signal based on human variable sensitivity to latency differences in multipath communications. For example, a human listener may hear two versions of a voice of a human speaker located in the same room, with a first version transmitted as sound waves through the air and a second version transmitted as an electronic audio signal amplified through a loudspeaker of headset or earbud worn by the listener. In this case the listener may perceive an echo effect due to slight differences in the times the listener hears the electronic and non-electronic versions of the speaker's voice. Experimentation has shown that a human listener's tolerance for latency between two received versions of an audio signal can vary, and the tolerance may depend on an amount of ambient noise. An improved point-to-point audio communication system may measure a level of ambient noise, and then select processing for a received electronic audio signal based on the measured level of ambient noise before emitting the processed audio signal at a loudspeaker worn by a listener.

In one aspect, audio processing operations may be selected to increase a noise floor in the audio signal, which may cause a longer latency difference between multipath signals to be more tolerable or even unnoticeable to a listener. In another aspect, when an existing noise floor allows for a longer latency, processing techniques may be selected having longer processing latency requirements. The longer latency processing techniques may provide an improvement in any of a variety of related processing attributes, such as a lower power requirement for the longer latency processing; when the processing includes audio compression, the longer latency processing may provide better compression than the compression with a shorter processing latency; and when the processing includes speech enhancement, the longer latency processing may provide better speech enhancement.

FIG. 1A illustrates an example point-to-point audio communication scenario 100. In scenario 100, a first user 110 is listening to a second user 120. For example, the first user may be a human listener, and the second user may a human speaker. Distance 140 between the first and second users 110, 120 may be sufficiently close (the first and second users are sufficiently proximate) for the first user 110 to hear the second user's speech via an audio air path 130 in which sound waves travel through air from first user 110 to second user 120, just as two humans might speak to each other face-to-face.

Communication scenario 100 also includes a second audio path, electronic path 132, which includes electronic transmission of an electronic audio signal. An example of electronic path 132 may include a remote mic 124 capturing the second user's speech as an electronic audio signal, and the captured signal may be transmitted electronically to be received at a device which may emit the electronic version of the second user's speech at a local loudspeaker 112 worn by first user. In some aspects, electronic path 132 may provide amplification of the speech, and/or the electronic audio path 132 may include other processing for improved communications, such as processing to adapt the electronic audio signal to limitations of the first user's hearing ability.

In scenarios with more than one audio path, such as scenario 100, first user 110 may experience an objectionable audio effect due to differences in the latencies of the multiple audio paths. When second user 120 speaks, first user 110 receives two versions of the second user's speech via audio paths 130, 132. When audio paths 130, 132 have different latencies, the two versions will be offset in time from each other, which may produce an echo effect for first user 110. Techniques discussed herein may tend to mitigate an echo effect experienced by first user 110.

In an aspect, example scenario 100 may include two-way communication, where both first and second users 110, 120 each act as speaker and listener. In this case, example scenario 100 may also include a local microphone 114 located at the first user 110 and a remote loudspeaker 122 located at the second user 120 as optional elements. In this case the air and electronic audio paths 130, 132 may be bi-directional, and the techniques discussed below, such as for mitigating echo, may be applied in both directions along the electronic path 132.

FIG. 1B illustrates an example point-to-point audio communication scenario 150. In scenario 150, a first user 110 is listening to a remote loudspeaker 152 via multiple audio paths. Loudspeaker 152 may convert an electronic audio signal from audio source 154 into sound waves which travel to first user 110 via the air path 130. In addition, the electronic audio signal from audio source 154 may also be transmitted to first user 110 via an electronic path 132. As in scenario 100 of FIG. 1B, if the latencies of audio paths 130 and 132 differ, first user 110 may experience an objectionable echo effect. Example scenario 150 may include, for example two users sharing the experience of watching a movie from audio source 154, on a television that includes remote loudspeaker 152. A second user (not depicted in FIG. 1B) may not desire or require the electronic amplification or processing of the audio signal, and hence only receives audio via a single air path.

In an aspect, electronic path 132 may include any of a variety methods for transmitting an analog or digital electronic audio signal. For example, digital signal may be transmitted via wireless network (e.g., Wi-Fi or Bluetooth) or via point-to-point wiring (e.g., USB or ethernet). Such digital transmission may be direct, or electronic path 132 may include an intermediate device such as a network router or computer server. An analog signal may be transmitted wirelessly via an analog radio signal, or via an analog wired connection. When electronic path 132 includes transmission of an analog signal, the analog signal may or may not be digitized for processing before being emitted at a local loudspeaker 112.

As depicted in FIG. 1A, local loudspeaker 112 and local microphone 114 may be incorporated into a single headset configured to be worn by first user 110. However, techniques described herein are not so limited. In some aspects, local loudspeaker 112 and/or local microphone 114 may be incorporated into one or two earbuds configured to be worn by first user 110. In other aspects, local loudspeaker 112 may not be worn by first user 110, where local loudspeaker 112 is positioned anywhere and air path 130 and electronic path 132 have different latencies.

FIG. 2 illustrates an example audio processing system 200 according to aspects of the subject technology. System 200 includes one or more microphone(s) 202, noise measurement processor 204, audio processor 206, and speaker 208. In some aspects, these elements of system 200 may all be located in a single device configured to be worn by a listening user. Such a device may be an earbud, watch, or headset worn by first user 110 of FIG. 1A/B. In operation, mic 202 may capture ambient sounds at a listening user. Noise measurement processor 204 may determine a noise level based on the captured ambient sounds. Audio processor 206 may process an electronic audio signal with processing operations controlled by, or selected based on, the noise determined noise level. Processed audio may be emitted by speaker 208.

In some optional aspects of system 200, the noise level may be determined by noise measurement processor 204 as a noise volume and/or a signal-to-noise ratio (SNR). A receiver 210 may receive the electronic signal from an audio source, such as via remote microphone 124 or audio source 154 (FIG. 1A/B). Audio processing may include, for example, altering a noise floor, applying or controlling a noise cancellation function, or otherwise enhancing the electronic audio signal for a user. In an aspect, noise measurement and/or audio processor 206 may operate on analog or digital signals.

FIG. 3 illustrates an example method 300 for audio processing according to aspects of the subject technology. Method 300 includes measuring an ambient noise level (box 302), receiving an electronic audio signal (box 304), then processing the received electronic audio signal based on the measured ambient noise level (box 306). The processed audio signal may then be emitted (box 308).

In aspects, the ambient noise level may be measured as sound or noise volume, or may be measured as a signal-to-noise ratio. The noise may be measured, for example, at a listener location via a local microphone (such as local microphone 114) or via a remote microphone (such as remote microphone 124). For example, the ambient noise level may be a measurement of the noise level in the listener's local, physical environment. Alternately a signal-to-noise ratio may be measured, for example as a ratio of a signal measured at remote microphone to noise measured at a local microphone. As discussed above, an electronic audio signal may be received (box 304) via a wired or wireless connection for an analog or digital signal. The processed audio signal may be emitted (box 308) at a loudspeaker proximate to a listener, for example a loudspeaker worn on the head of a listener or otherwise positioned near one or both of a listener's ears.

In optional aspects of method 300, processing the electronic audio signal (box 306) may include selecting a processing latency (box 320). The audio processing of box 306 may optionally include adding noise (box 322), controlling a noise cancellation function (box 324), and/or selecting a speech enhancement processing (box 326).

In box 320, a processing latency may be selected based on the measured ambient noise level, and then the subsequent audio processing performed in box 306 may be controlled by or selected by the selected processing latency. Experimental results have shown that a human listener's tolerance for multipath audio with a latency difference may vary with the amount of ambient noise heard by the listener. For example, with a human speaker 1 meter away from a human listener, the human listener may tolerate approximately a 20-millisecond delay between an air path and an electronic path for the speaker's voice in a very quiet (low noise) room, while in a noisier room, the same listener may tolerate a much larger latency difference between paths in a noisy room. In box 320, a processing latency for the audio processing of box 306 may be selected based on an estimated tolerance for multiple latency difference given the measured ambient noise level.

In an aspect, a processing latency may be selected based on an estimate of a distance between a speaker or other audio source and a listener (such as distance 140 in FIG. 1A/B). A distance may be estimated by a ranging detection process operating between a first device at the first user and a second device at the second user. For example, in the scenario 100 of FIG. 1A including two way communication, a first device attached to (or including) local loudspeaker 112 and local microphone 114 may perform a ranging detection process with a second device attached to (or including) remote loudspeaker 122 and remote microphone 124.

In an aspect the audio processing of box 306 may be based on noise level by selecting among a list of predetermined discrete processing operation alternatives. For example, an audio compression codec used to transmit a digital audio signal along electronic path 132, and predetermined discrete options may include not using an audio codec, using a first codec with low-latency and mild compression, and using a second codec with high-latency and high compression. High compression to a lower data rate of the second codec may be preferred to the mild compression to a higher data rate of the first codec when a higher-latency can be tolerated by the user and communication bandwidth is scarce. Processing in box 306 may then selecting the no audio codec as a lowest latency alternative for a quiet room (low ambient noise level); selecting the first audio codec as a medium latency alternative for a moderately noisy room (medium ambient noise); and selecting the second audio codec as a high latency alternative for the loudest rooms where a large multipath latency difference may be best tolerated. In this way, audio transmission bandwidth requirements may be reduced when a larger multipath latency difference can be better tolerated by a listener.

The audio processing of box 306 may be controlled by the measured noise level. In a first example of audio processing control, a noise floor may be raised in the emitted audio signal, where the amount of noise added is controlled based on the measured noise level. By raising the noise floor, a listener's tolerance for multipath latency difference may be increased. In an aspect, the noise floor may be raised to a degree determined to be inverse of the measured ambient noise. For example, the noise floor may be raised when the measured ambient noise is low, while the noise floor may be unchanged or lowered if the measured ambient noise is measured to be high. A noise floor may be raised: by adding an amount of artificial noise to the received audio signal based on the measured ambient noise; by adding an amount of captured ambient noise (e.g., captured by a local microphone such as local microphone 114) to the received audio signal based on the measured ambient noise; and/or by controlling a noise cancellation function for the listener to reduce the amount of noisy cancellation. Similarly, a noise floor may be lowered by controlling a noise cancellation function to increase the amount of noise cancellation.

In a second example of audio processing control, speech enhancement may be selected or controlled based on a measured noise level and/or a selected processing latency. Speech enhancement may include, for example, automated language translation or frequency band gain adjustments of the received audio signal based on limitations of a listener's hearing. The measured noise level and/or a selected processing latency may be used, for example, to control an audio buffer size for the enhancement processing, which may result in different latency requirements for the audio enhancement processing, and further result in changes in a multipath latency difference for the listener. Again, longer latency selections or controls may be made when a listener may tolerate larger multipath latency differences. In aspects, audio enhancement using longer latencies may result in improvement in various aspects of the audio enhancement. For example, a longer latency buffer may allow for better automated language translation, for more precise adjustments for a listener's hearing limitations, or for the use of algorithms with lower power consumption requirements.

In other aspects, the various techniques described herein for audio processing based on an ambient noise measurement may be combined. A first processing may be based on noise level by selecting among a list of predetermined discrete processing operation alternatives and a second processing may be controlled by the measured noise level. For example, a compression codec for transmission along the electronic path may be selected based on the noise level floor in the electronic signal may also be adjusted based on the ambient noise measurement. In such a case where multiple processing operations are selected and/or controlled based on the ambient noise measurement, a total latency incurred by the multiple processing operations may constrain the selection and/or control of the processing operations such that the total latency is tolerable or unnoticeable by a listener given the ambient noise measurement.

Figure 4:
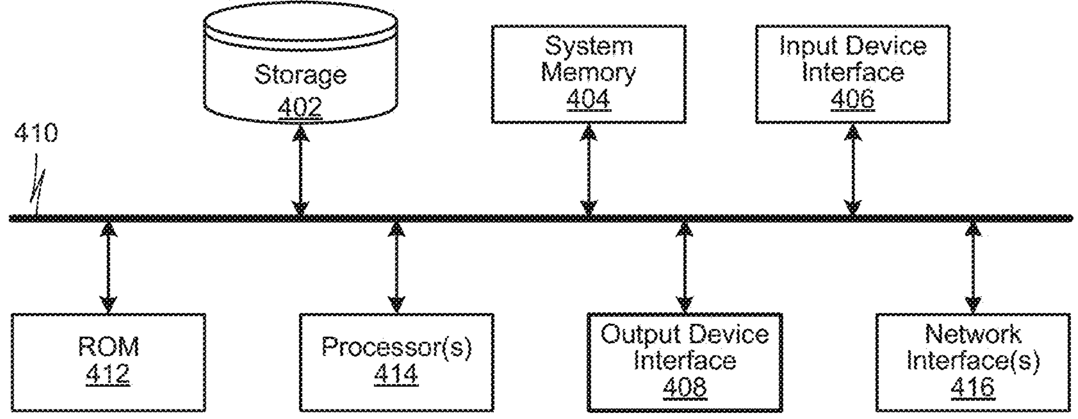
FIG. 4 illustrates an example computing device with which aspects of the subject technology may be implemented.

FIG. 4 illustrates an example computing device 400 with which aspects of the subject technology may be implemented in accordance with one or more implementations, including, for example system 200 (FIG. 2) and method 300 (FIG. 3). The computing device 400 can be, and/or can be a part of, any computing device or server for generating the features and processes described above, including but not limited to a laptop computer, a smartphone, a tablet device, a wearable device such as a goggles or glasses, a watch, an earbud or other audio device, a case for an audio device, and the like. The computing device 400 may include various types of computer readable media and interfaces for various other types of computer readable media. The computing device 400 includes a permanent storage device 402, a system memory 404 (and/or buffer), an input device interface 406, an output device interface 408, a bus 410, a ROM 412, one or more processing unit(s) 414, one or more network interface(s) 416, and/or subsets and variations thereof.

The bus 410 collectively represents all system, peripheral, and chipset buses that communicatively connect the numerous internal devices of the computing device 400. In one or more implementations, the bus 410 communicatively connects the one or more processing unit(s) 414 with the ROM 412, the system memory 404, and the permanent storage device 402. From these various memory units, the one or more processing unit(s) 414 retrieves instructions to execute and data to process in order to execute the processes of the subject disclosure. The one or more processing unit(s) 414 can be a single processor or a multi-core processor in different implementations.

The ROM 412 stores static data and instructions that are needed by the one or more processing unit(s) 414 and other modules of the computing device 400. The permanent storage device 402, on the other hand, may be a read-and-write memory device. The permanent storage device 402 may be a non-volatile memory unit that stores instructions and data even when the computing device 400 is off. In one or more implementations, a mass-storage device (such as a magnetic or optical disk and its corresponding disk drive) may be used as the permanent storage device 402.

In one or more implementations, a removable storage device (such as a floppy disk, flash drive, and its corresponding disk drive) may be used as the permanent storage device 402. Like the permanent storage device 402, the system memory 404 may be a read-and-write memory device. However, unlike the permanent storage device 402, the system memory 404 may be a volatile read-and-write memory, such as random-access memory. The system memory 404 may store any of the instructions and data that one or more processing unit(s) 414 may need at runtime. In one or more implementations, the processes of the subject disclosure are stored in the system memory 404, the permanent storage device 402, and/or the ROM 412. From these various memory units, the one or more processing unit(s) 414 retrieves instructions to execute and data to process in order to execute the processes of one or more implementations.

The bus 410 also connects to the input and output device interfaces 406 and 408. The input device interface 406 enables a user to communicate information and select commands to the computing device 400. Input devices that may be used with the input device interface 406 may include, for example, alphanumeric keyboards and pointing devices (also called "cursor control devices"). The output device interface 408 may enable, for example, the display of images generated by computing device 400. Output devices that may be used with the output device interface 408 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 4, the bus 410 also couples the computing device 400 to one or more networks and/or to one or more network nodes through the one or more network interface(s) 416. In this manner, the computing device 400 can be a part of a network of computers (such as a LAN, a wide area network ("WAN"), or an Intranet, or a network of networks, such as the Internet. Any or all components of the computing device 400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words “configured to,” “operable to,” and “programmed to” do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word “exemplary” is used herein to mean “serving as an example, instance, or illustration.” Any embodiment described herein as “exemplary” or as an “example” is not necessarily to be construed as preferred or advantageous over other implementations. Furthermore, to the extent that the term “include,” “have,” or the like is used in the description or the claims, such term is intended to be inclusive in a manner similar to the term “comprise” as “comprise” is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U. S. C. § 112(f) unless the element is expressly recited using the phrase “means for” or, in the case of a method claim, the element is recited using the phrase “step for.”

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean “one and only one” unless specifically so stated, but rather “one or more”. Unless specifically stated otherwise, the term “some” refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method of audio processing, comprising:

receiving, by a first device from a second device, an electronic audio signal corresponding to an audio source within a first proximity of a first user;

measuring a level of ambient noise with respect to the first user;

determining that the audio source is also present in the ambient noise such that a multipath latency difference exists between an ambient acoustic path of the audio source and an electronic path of the audio source that corresponds to the electronic audio signal;

processing the electronic audio signal based on the level of ambient noise to reduce an effect of the multipath latency difference; and causing the processed electronic audio signal to be emitted from a loudspeaker in a device communicatively coupled to the first device and configured to be worn by the first user.

2. The method of claim 1, wherein the audio source corresponds to a second user, the electronic audio signal is captured at a microphone of the second device, the microphone located proximate to the second user, and the measuring of the level of ambient noise is based on a signal captured at a microphone in the first device configured to be worn by the first user.

3. The method of claim 1, further comprising:

selecting, when the level of ambient noise is high, a first speech-processing pipeline having a first end-to-end latency, and when the level of ambient noise is low, a second speech-processing pipeline having a second end-to-end latency to reduce a latency discontinuity due to speech-processing pipeline delays, the second end-to-end latency being shorter than the first end-to-end latency.

4. The method of claim 1, wherein the level of ambient noise is a signal-to-noise ratio based on a source signal captured at a microphone of the second device located proximate to the audio source and an ambient noise signal captured at a microphone in the first device configured to be worn by the first user.

5. The method of claim 1, wherein the processing of the electronic audio signal includes:

raising a noise floor in the electronic audio signal based on the level of ambient noise to mask the multipath latency difference so that a latency discontinuity due to the multipath latency difference has a reduced perceptibility to the first user.

6. The method of claim 1, wherein the processing of the electronic audio signal includes:

when the level of ambient noise is low, raising a noise floor to a higher level to mask the multipath latency difference so that a latency discontinuity due to the multipath latency difference has a reduced perceptibility to the first user; and when the level of ambient noise is high, lowering the noise floor to a lower level.

7. The method of claim 5, wherein the raising the noise floor includes adding an artificial noise to the electronic audio signal.

8. The method of claim 5, wherein the raising the noise floor includes capturing an ambient noise, and adding the captured ambient noise to the electronic audio signal.

9. The method of claim 5, wherein the raising the noise floor includes reducing a noise cancelling effect at the loudspeaker in the device configured to be worn by the first user.

10. The method of claim 5, wherein the raising the noise floor in the electronic audio signal is further based on an estimate of a physical distance between the first user and the audio source.

11. The method of claim 3, wherein the processing of the electronic audio signal includes a speech enhancement processing of the electronic audio signal for the first user according to the first speech-processing pipeline or the second speech-processing pipeline.

12. The method of claim 11, wherein the speech enhancement processing includes language translation.

13. The method of claim 11, wherein the speech enhancement processing is based on an indication of a hearing limitation of the first user.

14. The method of claim 1, wherein the audio source is a second user, the second device is a user device of the second user, and the first proximity of the first user includes distances between the first user and the second user that are within human audible hearing range via sound waves traveling through air.

15. A system for audio processing, comprising:

a processor; and a memory storing instructions, that when executed by the processor, cause the system to:

receive, by a first device from a second device, an electronic audio signal corresponding to an audio source within a first proximity of a first user;

measure a level of ambient noise with respect to the first user;

determine that the audio source is also present in the ambient noise such that a multipath latency difference exists between an ambient acoustic path of the audio source and an electronic path of the audio source that corresponds to the electronic audio signal;

process the electronic audio signal based on the level of ambient noise to reduce an effect of the multipath latency difference; and cause the processed electronic audio signal to be emitted from a loudspeaker in a device communicatively coupled to the first device and configured to be worn by the first user.

16. The system of claim 15, wherein the processing of the electronic audio signal includes:

raising a noise floor in the electronic audio signal based on the level of ambient noise to mask the multipath latency difference so that a latency discontinuity due to the multipath latency difference has a reduced perceptibility to the first user.

17. The system of claim 15, wherein the processing of the electronic audio signal includes a speech enhancement processing of the electronic audio signal for the first user, the instructions further causing the system to:

select, when the level of ambient noise is high, a first speech-processing pipeline for the speech enhancement processing having a first end-to-end latency, and when the level of ambient noise is low, a second speech-processing pipeline for the speech enhancement processing having a second end-to-end latency to reduce a latency discontinuity due to speech-processing pipeline delays, the second end-to-end latency being shorter than the first end-to-end latency.

18. A non-transitory computer readable memory storing instructions that, when executed by a processor, cause the processor to:

receive, by a first device from a second device, an electronic audio signal corresponding to an audio source within a first proximity of a first user;

measure a level of ambient noise with respect to the first user;

determine that the audio source is also present in the ambient noise such that a multipath latency difference exists between an ambient acoustic path of the audio source and an electronic path of the audio source that corresponds to the electronic audio signal;

process the electronic audio signal based on the level of ambient noise to reduce an effect of the multipath latency difference; and cause the processed electronic audio signal to be emitted from a loudspeaker in a device communicatively coupled to the first device and configured to be worn by the first user.

19. The computer readable memory of claim 18, wherein the processing of the electronic audio signal includes:

raising a noise floor in the electronic audio signal based on the level of ambient noise to mask the multipath latency difference so that a latency discontinuity due to the multipath latency difference has a reduced perceptibility to the first user.

20. The computer readable memory of claim 18, wherein the processing of the electronic audio signal includes a speech enhancement processing of the electronic audio signal for the first user, the instructions further causing the processor to:

select, when the level of ambient noise is high, a first speech-processing pipeline for the speech enhancement processing having a first end-to-end latency, and when the level of ambient noise is low, a second speech-processing pipeline for the speech enhancement processing having a second end-to-end latency to reduce a latency discontinuity due to speech-processing pipeline delays, the second end-to-end latency being shorter than the first end to end latency.

* * * * *